(12) United States Patent
Clausen (10) Patent No.: US 8,042,568 B2
(45) Date of Patent: Oct. 25, 2011

(54) FLUID CONTROLLER AND A METHOD OF DETECTING AN ERROR IN A FLUID CONTROLLER

(75) Inventor: Martin Clausen, Bjerringbro (DK)

(73) Assignee: Sauer-Danfoss ApS, Nordborg (DK)

( * ) Notice: Subject to any disclaimer, the term of this patent is extended or adjusted under 35 U.S.C. 154(b) by 654 days.

(21) Appl. No.: 11/766,279

(22) Filed: Jun. 21, 2007

(65) Prior Publication Data
US 2007/0295924 A1 Dec. 27, 2007

(30) Foreign Application Priority Data
Jun. 22, 2006 (DK) .................................. 2006 00845

(51) Int. Cl.
*F16K 37/00* (2006.01)
(52) U.S. Cl. ................ 137/554; 137/625.65; 137/625.66
(58) Field of Classification Search ............... 137/487.5, 137/488, 554, 625.65, 625.66; 251/129.04; 180/403, 6.28, 6.3
See application file for complete search history.

(56) References Cited

U.S. PATENT DOCUMENTS

| | | | |
|---|---|---|---|
| 5,115,640 A * | 5/1992 | Stephenson et al. ............ 60/354 |
| 5,313,389 A * | 5/1994 | Yasui ............................... 701/43 |
| 5,386,365 A * | 1/1995 | Nagaoka ......................... 701/44 |
| 5,638,864 A | 6/1997 | Haarstad et al. |
| 5,992,458 A | 11/1999 | Novacek et al. |
| 6,014,598 A | 1/2000 | Duyar et al. |
| 6,470,300 B1 | 10/2002 | Benzinger et al. |
| 6,687,585 B1 | 2/2004 | Rizzoni et al. |
| 6,766,230 B1 | 7/2004 | Rizzoni et al. |
| 6,795,761 B1 * | 9/2004 | Lee et al. ......................... 701/41 |
| 6,816,804 B1 * | 11/2004 | Lee ............................... 702/148 |
| 2004/0143379 A1 * | 7/2004 | Borroni-Bird et al. ......... 701/36 |
| 2005/0159866 A1 * | 7/2005 | Takeuchi et al. ................ 701/41 |

* cited by examiner

*Primary Examiner* — Stephen M Hepperle
*Assistant Examiner* — Kevin Murphy
(74) *Attorney, Agent, or Firm* — McCormick, Paulding & Huber LLP (57) ABSTRACT

The invention provides a fluid controller for controlling a machine, e.g. for steering a vehicle. The controller comprises a housing defining an inlet port connected to the source and an outlet port connected to the pressure operated device. The flow rate is controlled by movement of a valve member within the housing, and a processor provides a reference which is indicative of a desired position of the valve member relative to the housing. The fluid controller comprises a fault detection system based on an observer. The observer calculates a theoretically correct position of the valve member relative to the housing for a given reference, and compares this position to an obtained position of the valve member relative to the housing. The difference between the positions is compared with a threshold value. In order to dynamically change the sensitivity of the system, the threshold value is scaled based on a gradient of the reference.

8 Claims, 8 Drawing Sheets

FLUID CONTROLLER AND A METHOD OF DETECTING AN ERROR IN A FLUID CONTROLLER

CROSS REFERENCE TO RELATED APPLICATIONS

Applicant hereby claims foreign priority benefits under U.S.C. §119 from Danish Patent Application No. PA 2006 00845 filed on Jun. 22, 2006, the contents of which are incorporated by reference herein.

FIELD OF THE INVENTION

The present invention relates to a fluid controller, e.g. for use in a steering system for a vehicle. In particular, the invention relates to a fluid controller operable to control a flow of a fluid from a source of pressurized fluid to a pressure operated device, the controller comprising:
 a housing defining an inlet port connected to the source and an outlet port connected to the pressure operated device,
 a valve member movable within the housing and cooperating therewith to provide the flow between the inlet port and the outlet port at a flow rate which depends on the position of the valve member relative to the housing,
 a processor providing a reference which is indicative of a desired position of the valve member relative to the housing
 an actuator adapted to move the valve member in accordance with a reference received from the processor,
 a sensor adapted to provide an output indicative of an obtained position of the valve member relative to the housing,
 an observer adapted, based on a reference, to determine a model output which is indicative of a theoretically correct position of the valve member relative to the housing, and to determine a residual value indicative of a difference between the output and the model output, and
 a fault detection system adapted to compare the residual value with a threshold value.

BACKGROUND OF THE INVENTION

Machines such as vehicles or ships, and in particular off-highway machinery such as wheel loaders, excavators, dozers, tractors, harvesters and similar heavy duty machines often operate with hydraulic steering systems. In fluid controllers for steering a vehicle or a ship, the valve member, e.g. in the form of a spool, often forms a neutral configuration and two operating configurations on opposite sides of neutral, corresponding to a left-turn and a right turn of the vehicle. Similar fluid controllers are, however, also applied in machines of a completely different kind, e.g. for controlling lifting in a crane, movement of robots, or in general for controlling a machine.

Typically, the steering system receives a steering input from an operator of the machine who thereby indicates a desired activity of the machine, e.g. a desired angular movement of a steering wheel of a vehicle. The steering input could be provided by an operator via a handle such as a steering wheel, a joystick, a push button etc. In a fluid controller, the steering input is converted into a hydraulic flow to a pressure operated device, e.g. a hydraulic actuator or cylinder which moves the steering wheels of a vehicle. A fluid controller of the above mentioned kind is disclosed e.g. in U.S. Pat. No. 5,992,458 and in U.S. Pat. No. 5,638,864 wherein the controller is disclosed in combination with an unequal area steering cylinder. Typically, the fluid controllers comprise a housing with a valve member which is movable in the housing and which cooperates with the housing to open and close various passages between the source and ports of the pressure operated device and possibly between other ports of the pressure operated device and a receptacle for the fluid.

Typically, the steering input which is provided on the handle is converted into a reference which is indicative of a desired position of the valve member relative to the housing. Based on the reference, the valve member is moved in the housing, e.g. by use of an electrically or hydraulically operated actuator. Some of the existing fluid controllers comprise a sensor which provides an output indicative of an actual position of the valve member relative to the housing.

To detect faults in the system, an integrated observer may determine a theoretical model output which is indicative of a theoretically correct position of the valve member relative to the housing based on a specific reference. The observer may thereby provide a residual value which indicates a possible difference between the output as provided by the sensor and the model output determined from the reference and a model of the system.

By comparing the residual value with a threshold value, an alert can be provided when a specific reference does not lead to a desired position of the valve member relative to the housing. This situation may occur e.g. if movement of the valve member in the housing is restricted.

U.S. Pat. No. 6,766,230, U.S. Pat. No. 6,470,300 and U.S. Pat. No. 6,687,585 all disclose various fault detection systems and methods for vehicles, engines etc.

In the existing fluid controllers, a discrepancy exist between on the one hand to set the threshold value relatively close to zero thereby to detect a majority of the situations in which the valve member does not move in an intended way, and on the other hand, not to be alert unless there is an error which is significant.

SUMMARY OF THE INVENTION

It is an object of a preferred embodiment of the invention to improve fluid controllers of the above-mentioned kind, and in particular to provide a system which at one time is sensitive to detect important errors and which is not too sensitive to be interrupted by inessential errors.

Accordingly, the invention provides a fluid controller of the kind mentioned in the introduction wherein the fluid controller is adapted to provide a gradient of the reference and to scale the threshold value based on the gradient. Since faults are detected merely by use of a sensor which detects the position of a valve member, i.e. corresponding to the spool sensor existing already in many commercially available steering systems, a more complicated closed loop control of a steering system by use of wheel position sensors etc. can be avoided. The invention thereby provides for a simple and reliable steering system.

The gradient expresses the speed at which the reference is changed, e.g. in increments per time unit. If a reference* is received a time step of a length X after a previously received reference, the gradient g could be expressed generally as:

$$g(x) = \frac{\text{reference}^* - \text{reference}}{x}$$

In practice x could be a fixed value, i.e. the reference is delivered by the processor at a fixed frequency."

If the gradient is high the residual value will tend to be high, and a fault alarm is disposed to be activated unjustifiably. According to the invention, the threshold value may be increased as a function of the gradient, and the sensitivity of the fault alarm is therefore adjusted based on the gradient. This facilitates a system with less unjustified alarms and with an acceptable sensitivity. The threshold value could e.g. be scaled proportionally to the gradient. As an example, the threshold value could be expressed as an integer multiplied with the gradient.

The comparing of the threshold value with the residual value may be used to trigger a fault alarm, e.g. for stopping the machine which is controlled by the fluid controller.

The processor could be a computer system which forms part of the fluid controller, e.g. formed in one component with the housing and valve member or at least be attachable to the housing and valve member. The processor could be software implemented in a computer system, e.g. comprising a standard integrated circuit for computers such as PCs or in an ASIC.

The reference could be expressed by a number, and the gradient could be expressed as the percentage by which the number has changed since the last time a reference is received or a value by which the number changes per time unit. Correspondingly, the threshold value may be expressed by a number, and this number is changed as a function of the gradient.

Correspondingly, the residual value could be expressed by a number which is compared with the threshold value for generating an alarm signal under predetermined conditions.

The observer could be implemented as software in a standard computer system such as a PC or the like, or the observer could form part of an application specific integrated circuit (ASIC) and be an integrated part of the processor of the fluid controller.

The valve member could be either slidably or rotatably received in the housing, and cooperation between the housing and the valve member may open and close various passages depending on the position of the valve member relative to the housing. As an example, a passage between the source of pressurised fluid and one out of several steering ports, e.g. for right and left turning of a movable machine could be opened simultaneously with opening of passages between other of the ports and a receptacle for collection of fluid which has been used for steering purposes in a previous steering sequence.

As it will be discussed in further details later, the observer may operate in accordance with the Luenberger observer-based fault detection method.

In one embodiment, the reference is provided at a fixed frequency.

When the residual value has been compared with the scaled threshold value, the fluid controller may activate an alarm signal, e.g. if the residual value exceeds the threshold value. The alarm signal could be any kind of signal, e.g. a stop signal which prevents further operation of the machine in question, an acoustical or optical alarm etc.

The invention is particularly useful in combination with a Steer by Wire (SbW) steering system, and in particular in combination with an SbW system with two parallel systems. One of the parallel systems may operate the steering system under normal conditions. An error in this main steering system can be detected in accordance with the present invention, and the steering system could be adapted, based on a detected fault, automatically to shift to the other one of the two parallel systems. In this case, the driver could be notified to have the main system repaired and optionally be instructed to drive at a low speed.

In a second aspect, the invention provides an error detection method for a fluid controller of the kind comprising:
a housing defining an inlet port connected to a source of pressurised fluid and an outlet port connected to a pressure operated device,
a valve member movable within the housing and cooperating therewith to provide a flow between the inlet port and the outlet port at a flow rate which depends on the position of the valve member relative to the housing,
an actuator adapted to move the valve member in accordance with a reference received from the processor, and
a sensor adapted to provide an output indicative of an actual position of the valve member relative to the housing,
said method comprising the steps of:
providing a reference which is indicative of a desired position of the valve member relative to the housing,
based on the reference, determining a model output which is indicative of a theoretically correct position of the valve member relative to the housing,
determining a residual value indicative of a difference between the output and the model output, and
providing a threshold value,
determining a gradient of the reference,
scaling the threshold value based on the gradient, and
comparing the residual value with the scaled threshold value.

In a third aspect, the invention provides a steering system for a vehicle, said system comprising a fluid controller operable to control a flow of a fluid from a source of pressurized fluid to a pressure operated device, the controller comprising:
a housing defining an inlet port connected to the source and an outlet port connected to the pressure operated device,
a valve member movable within the housing and cooperating therewith to provide the flow between the inlet port and the outlet port at a flow rate which depends on the position of the valve member relative to the housing,
a processor providing a reference which is indicative of a desired position of the valve member relative to the housing
an actuator adapted to move the valve member in accordance with a reference received from the processor,
a sensor adapted to provide an output indicative of an obtained position of the valve member relative to the housing,
an observer adapted, based on a reference, to determine a model output which is indicative of a theoretically correct position of the valve member relative to the housing, and to determine a residual value indicative of a difference between the output and the model output, and
a fault detection system adapted to compare the residual value with a threshold value,
characterised in that the fluid controller is adapted to provide a gradient of the reference and to scale the threshold value based on the gradient.

Any of the more specific details mentioned relative to the first aspect of the invention may apply to the second and third aspects of the invention.

BRIEF DESCRIPTION OF THE DRAWINGS

In the following, a preferred embodiment of the invention will be described in further details by use of the following denotations.

PVE: An electrical actuation unit for hydraulic proportional valves
PVE H-bridge: see FIG. 1.
LVDT: Linear variable displacement transducer
ASIC: Application specific integrated circuit.
PVG32: A proportional valve.
RHP: Right half-plane
SbW architecture: Steer-by-wire architecture
1oo1: one-out-of-one
1oo1D: one-out-of-one with diagnostics
2oo2: two-out-of-two
3oo3: three-out-of-three The embodiment is described with reference to the drawing in which.

DETAILED DESCRIPTION OF THE INVENTION

Figure 1:
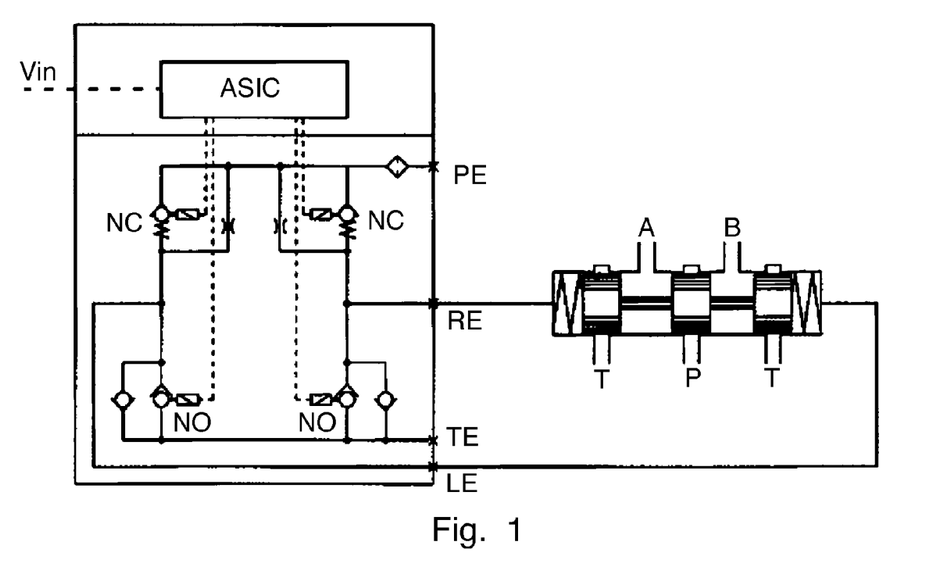
FIG. 1 illustrates a schematic view of a PVE H-bridge hydraulic system.

In the following example, a PVE, i.e. an electronically actuated valve, is applied in an H-bridge as disclosed in FIG. 1. The H-bridge is used for controlling a small pilot flow that again controls the position of the spool (or valve member), cf. FIG. 1. The claimed actuator is then constituted by the pilot flow.

Figure 2:
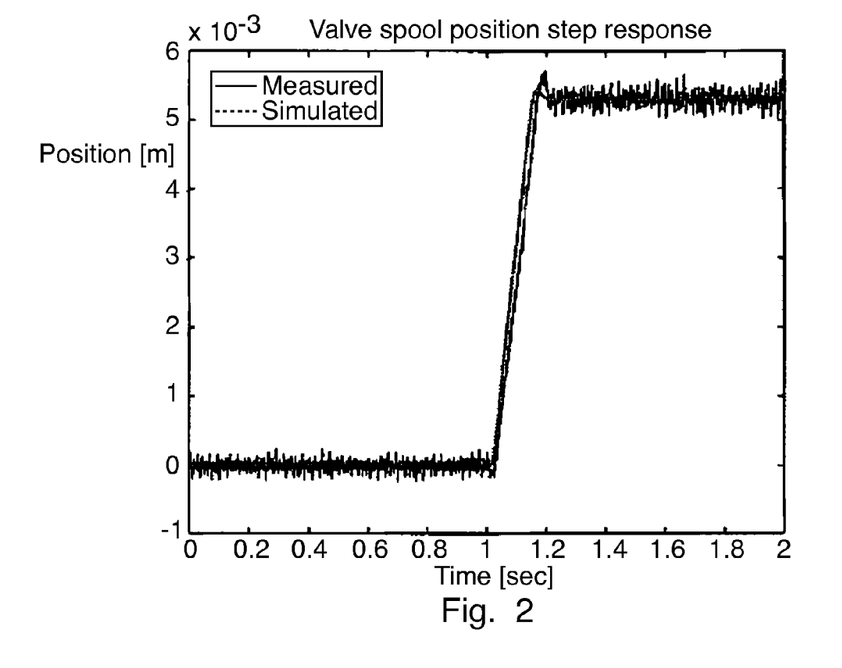
FIG. 2 illustrates a step response of a PVE controlled valve spool (i.e. a valve member)

An LVDT sensor measures the actual spool position whereafter an ASIC compares this to the commanded reference. A P-controller is used for controlling the duty cycle in a 40 Hz pwm signal that directly controls the switch patterns for the four on-off valves. In FIG. 2 a step response is shown of the valve spool position as it was measured on a physical Sauer-Danfoss PVG32 proportional valve. Also shown in the figure is the step response as obtained from a simulation model based on first principles.

Figure 3:
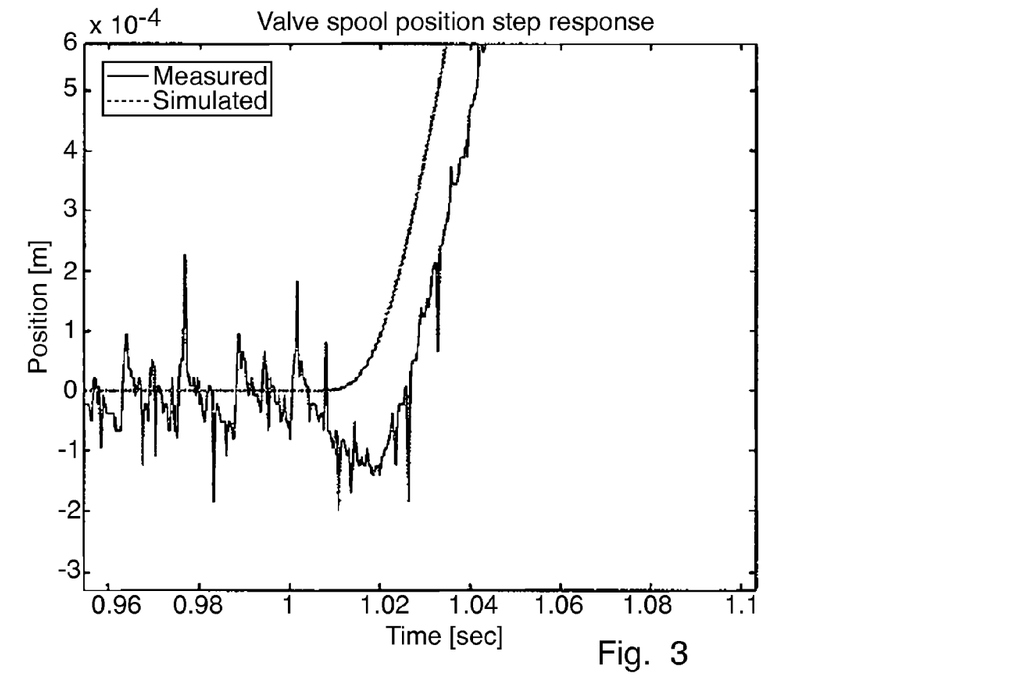
FIG. 3 illustrates initial inverse behaviour in PVE step response.

Although the two plots show fairly good correspondence, the simulation model, when based solely on first principles, seems to miss the initial inverse behaviour as the measured response exhibits, see FIG. 3.

Figure 4:
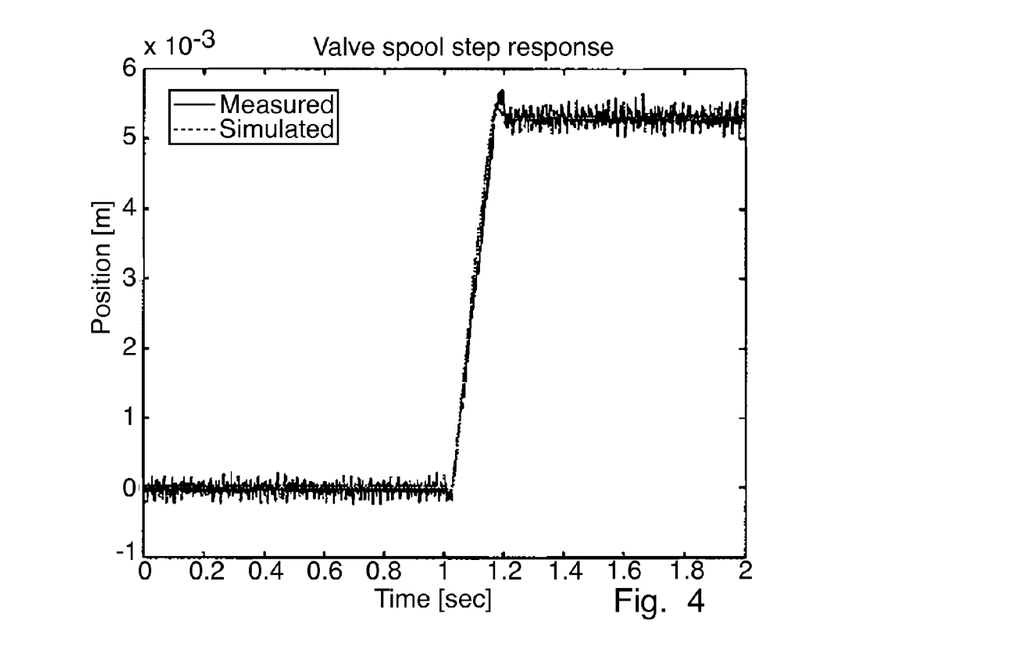
FIG. 4 illustrates initial inverse behaviour in PVE step response

To account for this the simulation model is extended with a right half plane (RHP) zero. With this modification the simulation model response corresponds closely to the measured data, see FIG. 4.

From experiments it is found that the PVE dynamics may be approximated by the following transfer function:

$$H = \frac{48^2}{s^2 + 2 \cdot 0.78 \cdot 48s + 48^2} \cdot \frac{130 - s}{s + 130} \quad (1.1)$$

Figure 5:
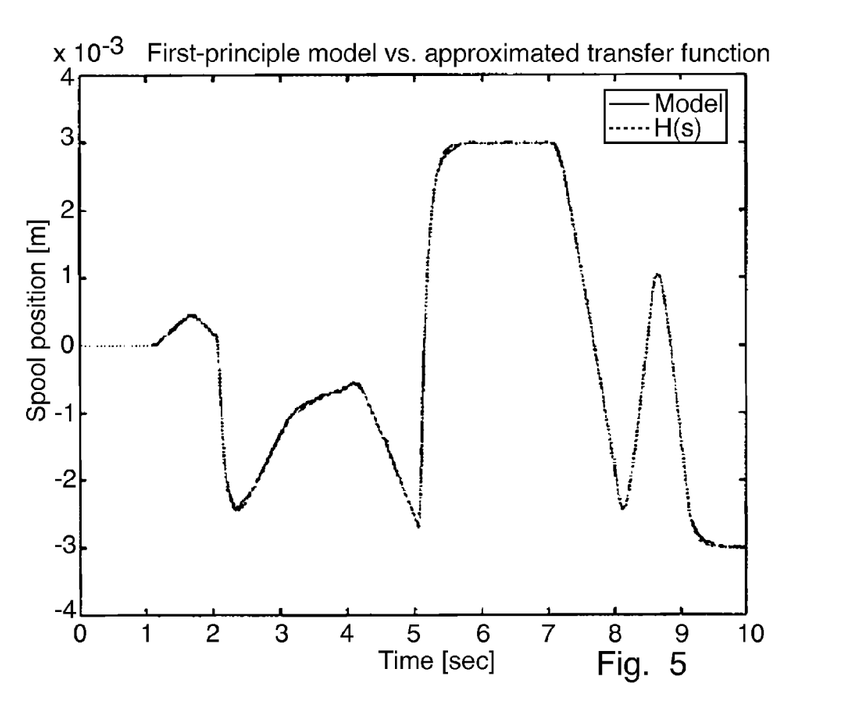
FIG. 5 illustrates response comparison between approximated PVE transfer function and first-principle model.

In FIG. 5 the response of the transfer function H (1.1) is compared to the response from the extended first principle simulation model. The commanded spool trajectory used in the simulation is arbitrarily chosen.

As seen from FIG. 5 the transfer function H (1.1) approximates the PVE dynamics closely.

In this section it is chosen to explore the applicability of a Luenberger observer-based fault detection method [?]. However before introducing the observer, the PVE transfer function (1.1) is first considered in a state-space formulation:

$$\dot{x}(t) = Ax(t) + Bu(t) + R_1 f(t)$$

$$y(t) = Cx(t) + Du(t) + R_2 f(t) \quad (1.2)$$

where $R_1$ and $R_2$ are the fault entry matrices. Next the observer structure is introduced:

$$\dot{z}(t) = Fz(t) + Ky(t) + TJu(t)$$

$$w(t) = Gz(t) + Ry(t) + Su(t) \quad (1.3)$$

where z(t) is the observer state vector. If the system (1.2) is observable the observer exists and its output w will asymptotically approach a linear transformation of the system state x, that is $\lim_{t \to \infty}[w(t) - Lx(t)] = 0$, where L is a matrix performing the linear transformation, if the following conditions are met [?]:

F has stable eigenvalues $TA - FT = KC$ $J = TB - KD$ $RC + GT = L$ $S + RD = 0 \quad (1.4)$ where the matrix T is a transformation matrix.

If the matrix L is chosen as L=C then an output estimation is achieved:

$$\hat{y}(t) = w(t) + Du(t) \quad (1.5)$$

From (1.2) and (1.5) the residual vector r(t) is formed:

$$r(t) = Q[y(t) - \hat{y}(t)] \quad (1.6)$$
$$= Q[y(t) - (w(t) + Du(t))]$$
$$= Q(y(t) - Gz(t) - Ry(t) - Su(t) - Du(t))$$
$$= -QGz(t) + (Q - QR)y(t) - Q(S + D)u(t)$$
$$= L_1 z(t) + L_2 y(t) + L_3 u(t)$$

Now by combining (1.3) and (1.6) the following residual observer is obtained:

$$\dot{z}(t) = Fz(t) - Ky(t) + Ju(t)$$

$$r(t) = L_1 z(t) + L_2 y(t) + L_3 u(t) \quad (1.7)$$

If we form the error vector as:

$$e(t) = z(t) - Tx(t) \quad (1.8)$$

then the error dynamics can be expressed as:

$$\dot{e}(t) = \dot{z}(t) - T\dot{x}(t) \quad (1.9)$$
$$= Fz(t) + Ky(t) + Ju(t) - TAx(t) - TBu(t) - TR_1f(t)$$
$$= Fz(t) + (KC - TA)x(t) + (J + KD - TB)u(t) +$$
$$KR_2f(t) - TR_1f(t)$$
$$= Fe(t) + (FT + KC - TA)x(t)(J + KD - TB)u(t) +$$
$$KR_2f(t) - TR_1f(t)$$

This combined with the requirements in (1.4) reduces to:

$$\dot{e}(t) = Fe(t) + KR_2f(t) - Tr_1f(t) \quad (1.10)$$

The error dynamics thus solely depends on the presence of faults.

The residual vector may be expressed as:

$$r(t) = L_1z(t) + L_2y(t)L_3u(t) \quad (1.11)$$
$$= L_1e(t) + (L_1T + L_2C)x(t) + R_2f(t) + (L_3 + L_2D)u(t)$$

If the matrices are chosen such that:

$$L_1T + L_2C = 0$$
$$L_3 + L_2D = 0 \quad (1.12)\ (1.13)$$

then (1.11) reduces to:

$$r(t) = L_1e(t) + L_2R_2f \quad (1.14)$$

The residual vector is seen to solely depend on the presence of system faults.

In the following this method of fault detection is implemented on the validated first principle PVE model. It is chosen to use a full order observer where the observer poles are six times as fast as the poles in the observed system, i.e. the system in (1.2). The Q matrix is chosen as Q=130000.

Figure 6:
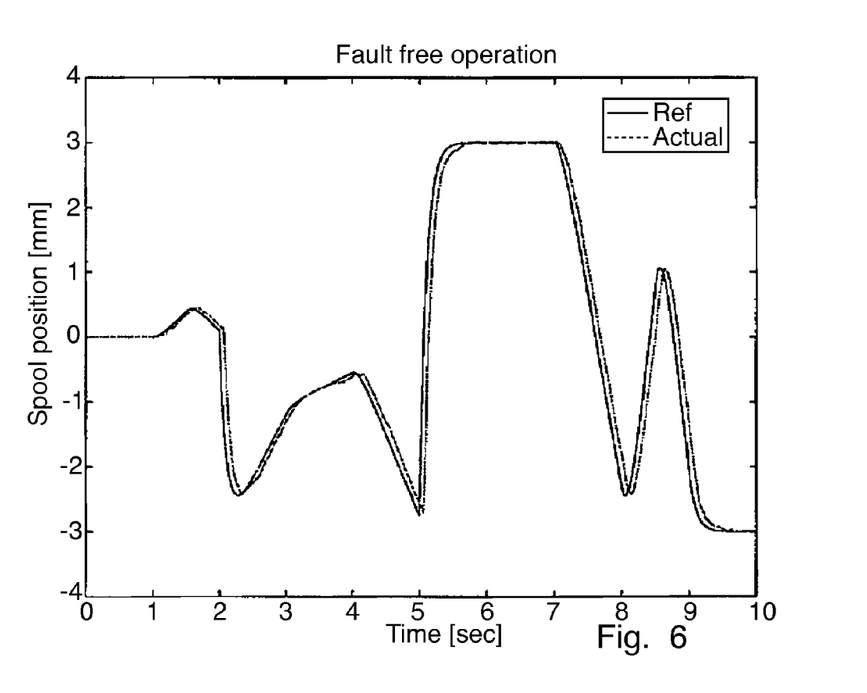
FIG. 6 illustrates a fault free spool (i.e. a valve member) position response.
Figure 7:
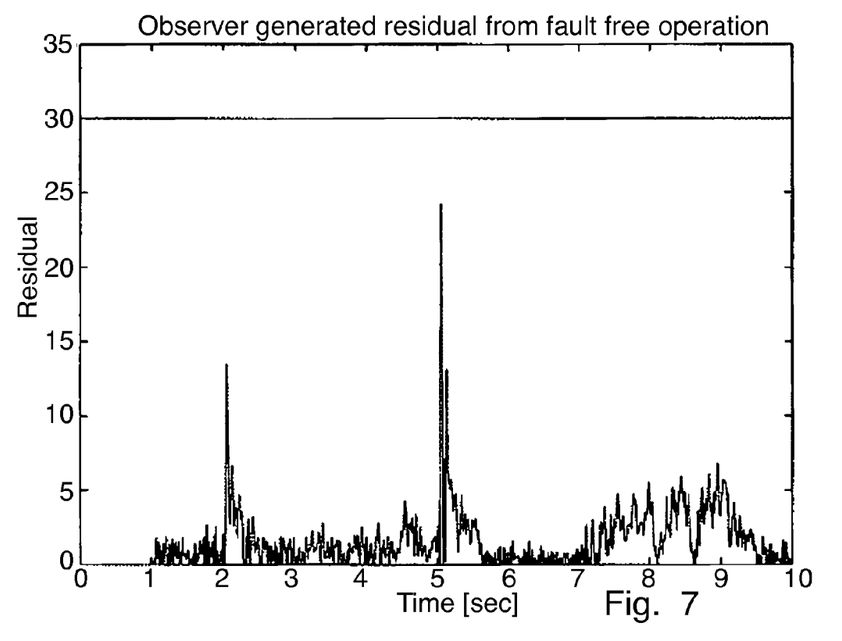
FIG. 7 illustrates a residual in fault free case

When simulating the steering valve spool position without any valve failures, the response becomes as sown in FIG. 6. Again an arbitrary reference position is used. The generated residual signal is as illustrated in FIG. 7. In the figure is also illustrated a threshold value of 30, somewhat arbitrarily chosen that may be used to raise a failure alarm when crossed by the residual signal.

Figure 8:
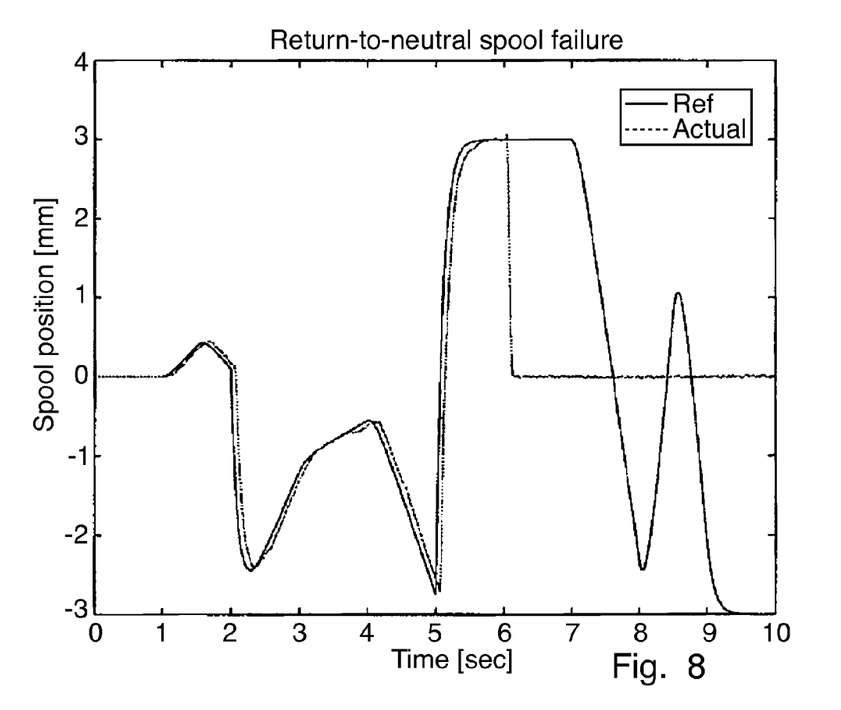
FIG. 8 illustrates a steering valve fault causing the spool to return to neutral

Next the fault scenario where the spool returns to neutral is considered. This kind of fault will not be detected by the existing fault detection method already implemented in the PVE, since the consequence of the fault does not cause the spool position to exceed the reference. In FIG. 8 the PVE is failing after 6 sec of operation.

Figure 9:
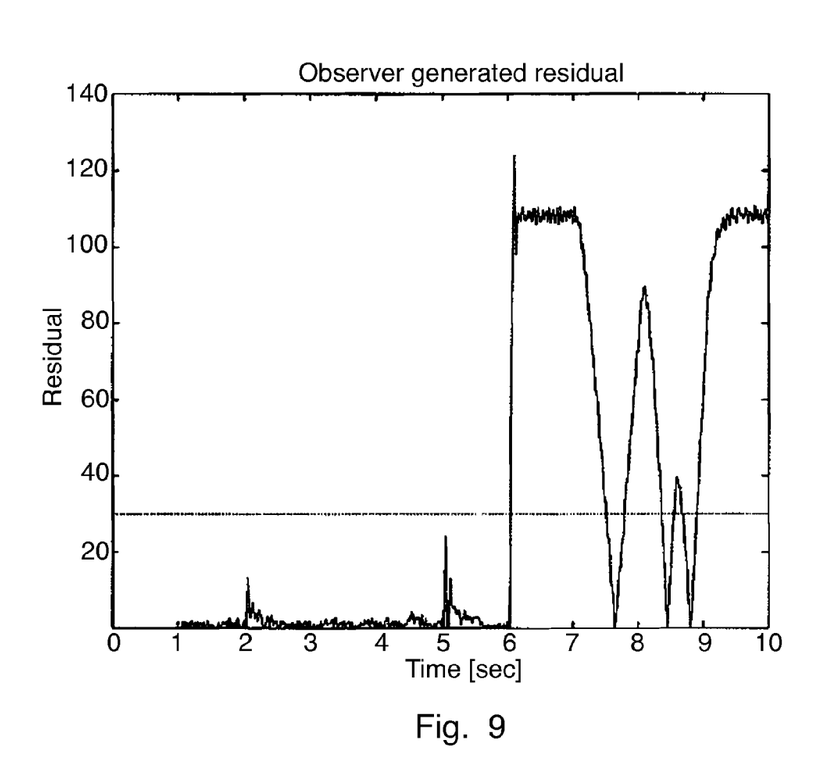
FIG. 9 illustrates a residual for the system when a fault causes the spool to return to neutral
Figure 10:
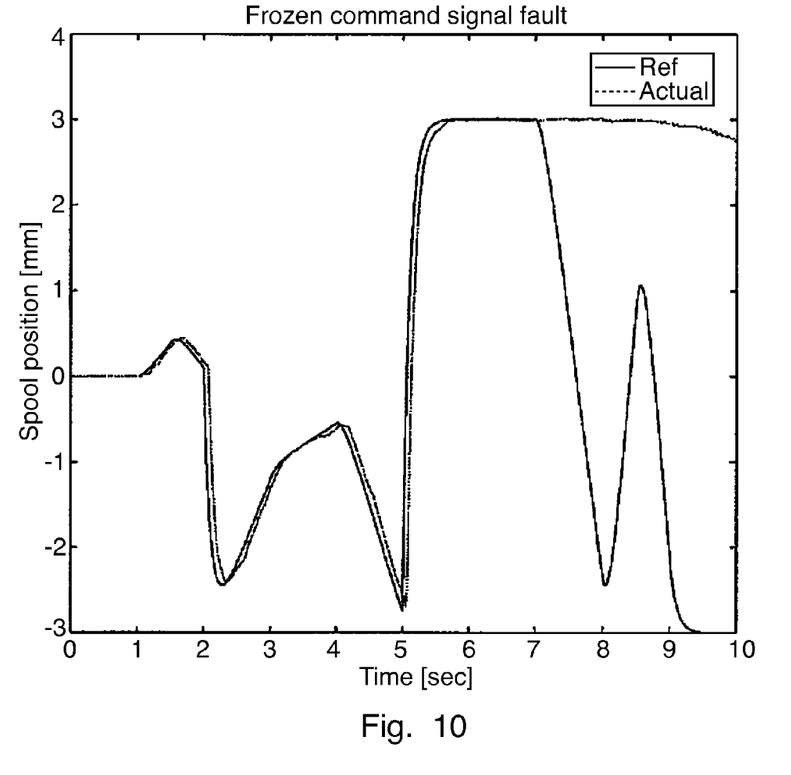
FIG. 10 illustrates a frozen command signal fault.
Figure 11:
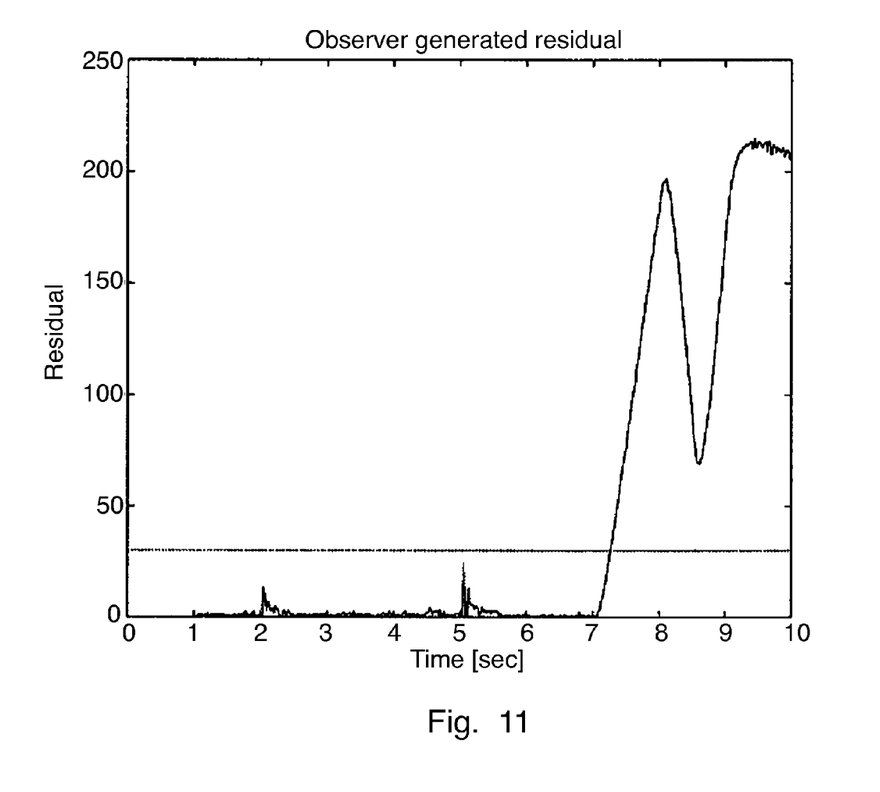
FIG. 11 illustrates a residual for the system with a frozen PVE command signal fault.

From FIG. 9 it is seen that the residual quickly crosses the fixed threshold value after the fault occurs. This is expected since the residual generator is based on an output observer and since the consequence of the fault is a large deviation between commanded output and actual output, see FIG. 8. What if the valve fails with a frozen command signal value? Then no sudden large deviation occurs. In FIG. 10 a frozen command signal is introduced after 6 sec. Clearly the observer does not detect this fault immediately, as is evident from FIG. 11.

It may be argued that even though the observer does not immediately detect when the fault occurs, it does rather quickly detect when the valve fails. Looking at the valve spool position response in FIG. 10 it is seen that the valve does not fail after six seconds, even though this is the time when the fault occurs. The observer is thus not a fault detection observer but rather a failure detection observer.

The magnitude in spool position error is thus critical for quick failure detection and because of this it may seem advantageous to use a small threshold value. However as seen from FIG. 9 the threshold can not be made arbitrarily small for several reasons. Model inaccuracies will result in a nonzero residual even though no faults have occurred. Also, since the observer does not have infinite dynamics, it will take some time for it to asymptotically approach the actual spool position. This is evident from FIG. 7 where large spool position gradients are introduced after two and five seconds. A way of improving the failure detection speed of the observer will thus be to make the observer poles even faster in order to reduce the "false alarm" peaks in the residual signal and afterwards also reduce the fixed threshold value. This is, however, not likely to be a viable approach since the observer may become unstable if the poles are made too fast.

Figure 12:
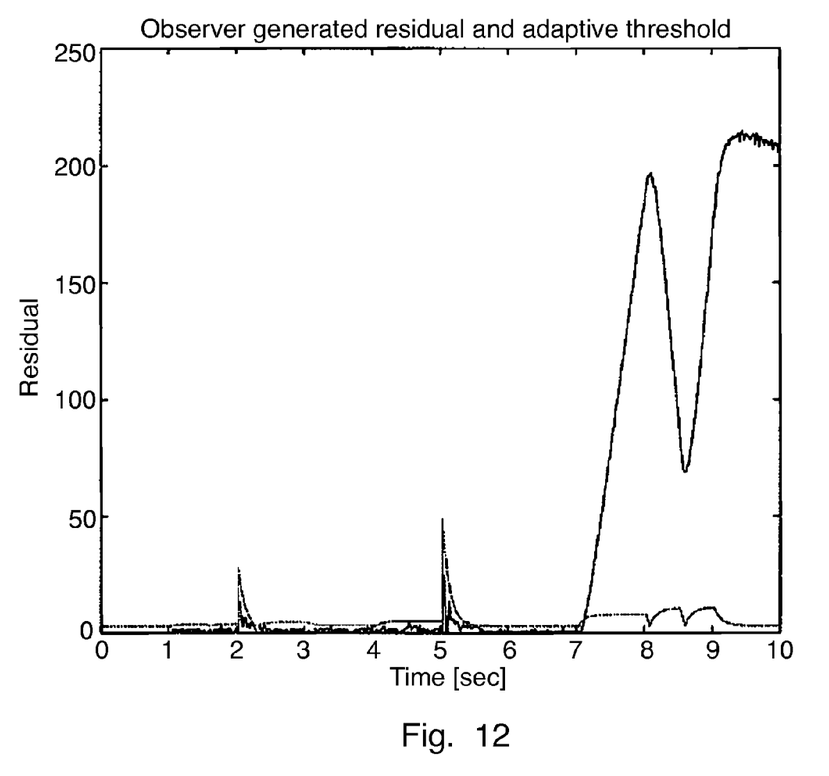
FIG. 12 illustrates a residual and adaptive threshold for the system with a frozen PVE command signal fault after six seconds, Further information is available in JIE Chen, Ron J. Patton (1999). Robust Model-Based Fault Diagnosis for Dynamic Systems. Kluwer Academic Publishers.

To overcome the necessity of large fixed thresholds in order to provide robustness to false alarms it is now suggested to use the gradient of the reference signal to adaptively scale the threshold value. In situations where large gradients occur the threshold is momentarily increased. In this way the false alarm peaks will not result in real false alarms. In FIG. 12 the threshold is generated as $TH = c + k|\dot{x}_{ref}|$ where c=3 and k=800.

As seen from FIG. 12 a low fixed threshold value may now solely be used to improve the failure detection speed. Robustness to false alarms is introduced by the adaptive scaling scheme.

The observer based fault detection method used is particularly useful for pilot operated hydraulic valves, as the considered PVE, since practically no external disturbances exist. In case external disturbances did exist, they would impact the state velocity vector in (1.2) in the same way faults would do. It will in this situation be required to decouple the external disturbances from the residual generator. One way of doing this may be to use an unknown input observer [?]. However, for the PVE case considered here this will imply that at least one additional state must be measured in order to both decouple the disturbance and detect failures. If the unknown input observer approach is adopted it will be required to model how the external disturbances map into the state velocity space. This may prove to be a difficult task. However, for pilot operated valves do practically only flow-induced spool forces act as external disturbances. But since the generated actuation force, from the pilot pressure, is usually significantly larger at nominal flow rates than the flow induced forces, it may be justifiable to neglect external disturbances in the model description.

In the design procedure it has now been shown that primary steering valve failures are detectable. The required safety strategy regarding online fault detection is therefore fulfilled. The final step is now to design a dynamic performance control strategy and validate it together with the performance of the fault detection method. This will, however, not be done in this case study as it is similar to what is done in conventional design methods.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A fluid controller operable to control a flow of a fluid from a source of pressurized fluid to a pressure operated device, the controller comprising:

a housing defining an inlet port connected to the source and an outlet port connected to the pressure operated device, a valve member movable within the housing and cooperating therewith to provide the flow between the inlet port and the outlet port at a flow rate which depends on the position of the valve member relative to the housing, a processor providing a reference which is indicative of a desired position of the valve member relative to the housing, an actuator adapted to move the valve member in accordance with the reference, a sensor adapted to provide a sensor output indicative of an obtained position of the valve member relative to the housing, an observer adapted to determine a model output based on the reference, and to determine a residual value indicative of a difference between the sensor output and the model output, and a fault detection system adapted to compare the residual value with a threshold value, wherein the fluid controller is adapted to provide a gradient that is calculated based on the reference and another reference provided by the processor earlier in time, and to scale the threshold value based on the gradient.

2. The fluid controller according to claim 1, wherein the valve member is slidably movable within the housing.

3. The fluid controller according to claim 1, wherein the valve member is rotationally movable within the housing.

4. The fluid controller according to claim 1, wherein the observer operates in accordance with the Luenberger observer-based fault detection method.

5. The fluid controller according to claim 1, wherein the reference is provided at a fixed frequency.

6. The fluid controller according to claim 1, wherein the comparing of the residual value with the threshold value controls activation of a fault alarm.

7. An error detection method for a fluid controller of the kind comprising:

a housing defining an inlet port connected to a source of pressurised fluid and an outlet port connected to a pressure operated device, a valve member movable within the housing and cooperating therewith to provide a flow between the inlet port and the outlet port at a flow rate which depends on the position of the valve member relative to the housing, a processor for providing a reference indicative of a desired position of the valve member relative to the housing;

an actuator adapted to move the valve member in accordance with the reference, and a sensor adapted to provide a sensor output indicative of an actual position of the valve member relative to the housing, said method comprising the steps of:

determining a model output based on the reference, determining a residual value indicative of a difference between the sensor output and the model output, and providing a threshold value, determining a gradient based on the reference and another reference provided by the processor earlier in time, scaling the threshold value based on the gradient, and comparing the residual value with the scaled threshold value.

8. A steering system for a vehicle, said system comprising a fluid controller operable to control a flow of a fluid from a source of pressurized fluid to a pressure operated device, the controller comprising:

a housing defining an inlet port connected to the source and an outlet port connected to the pressure operated device, a valve member movable within the housing and cooperating therewith to provide the flow between the inlet port and the outlet port at a flow rate which depends on the position of the valve member relative to the housing, a processor providing a reference which is indicative of a desired position of the valve member relative to the housing, an actuator adapted to move the valve member in accordance with the reference, a sensor adapted to provide a sensor output indicative of an obtained position of the valve member relative to the housing, an observer adapted to determine a model output based on the reference, and to determine a residual value indicative of a difference between the sensor output and the model output, and a fault detection system adapted to compare the residual value with a threshold value, wherein the fluid controller is adapted to provide a gradient based on the reference and another reference provided by the processor earlier in time, and to scale the threshold value based on the gradient.

* * * * *